United States Patent [19]

Grampp et al.

[11] 4,109,017

[45] Aug. 22, 1978

[54] METHOD FOR CLARIFICATION OF FRUIT JUICE

[75] Inventors: Ekkehard Grampp, Ober Ramstadt, Darmstadt; Reinhold Schmitt, Zwingenberg; Reinhold Urlaub, Darmstadt, all of Fed. Rep. of Germany

[73] Assignee: Rohm GmbH, Darmstadt, Fed. Rep. of Germany

[21] Appl. No.: 755,085

[22] Filed: Dec. 28, 1976

[30] Foreign Application Priority Data

Feb. 25, 1976 [DE] Fed. Rep. of Germany ....... 2607532

[51] Int. Cl.$^2$ ................................. A23L 2/30
[52] U.S. Cl. .................... 426/51; 426/330.5; 426/599; 426/423; 426/495
[58] Field of Search ............ 426/50, 51, 52, 15, 426/599, 495, 330.5, 423

[56] References Cited

U.S. PATENT DOCUMENTS

| | | | |
|---|---|---|---|
| 1,197,442 | 9/1916 | Burke et al. | 426/330.5 |
| 1,659,086 | 2/1928 | Darling | 426/51 |
| 1,953,754 | 4/1934 | Gore et al. | 426/51 X |
| 2,419,286 | 4/1947 | Rooker | 426/15 X |
| 2,736,655 | 2/1956 | Gordon et al. | 426/50 |
| 2,873,192 | 2/1959 | Walles et al. | 426/330.5 X |
| 2,928,741 | 3/1960 | Arengo-Jones | 426/15 X |
| 3,041,175 | 6/1962 | Atkinson et al. | 426/15 X |
| 3,236,655 | 2/1966 | Murch et al. | 426/50 |
| 3,795,521 | 3/1974 | Richard | 426/495 X |
| 3,958,023 | 5/1976 | Butterworth | 426/330.5 X |
| 4,027,046 | 5/1977 | Bohm et al. | 426/330.5 X |

OTHER PUBLICATIONS

Enzyme Topics, No. 3, May 1964, Rohm and Haas Co., Phila. Pa.

*Primary Examiner*—Robert A. Yoncoskie
*Attorney, Agent, or Firm*—Curtis, Morris & Safford

[57] ABSTRACT

In a method for the clarification of fruit juice by treatment thereof with pectinase at a temperature between 35° and 55° C. and subsequent settling in the presence of gelatin and silica sol, the improvement wherein the settling is carried out at a temperature between 35° and 55° C.

5 Claims, No Drawings

METHOD FOR CLARIFICATION OF FRUIT JUICE

The present invention relates to a method for the clarification of fruit juice, particularly of apple juice. More in particular, the juice clarification method comprises an enzymatic step in which pectins are primarily decomposed, and a subsequent settling step.

Freshly pressed apple juice is freed in a separator of coarse materials causing turbidity prior to the clarification method of the invention, but nevertheless is still not clear after such separation. For further clarification, the juice is treated with pectinases. The decomposition of pectin is concluded in less than an hour, using the usual processing techniques and fruit of the average sort, if the enzyme treatment takes place at temperatures between 40° and 50° C. The fine turbidifying materials contained in the juice settle during the subsequent settling as a sediment. Before settling, gelatin and, optionally, bentonite or a silica sol, is added to the juice, whereby the effect of settling is improved. For the settling, a temperature of from 18° – 20° C. is viewed as optimum. In this case, the settling lasts at least 4 hours and is often carried out by standing overnight. The juice clarified in this way can be filtered and bottled or further treated in other ways.

Additional difficulties are presented by fruit juices containing starch. The starch content of fruit juices varies considerably according to origin and season. In order to carry out a faultless and stable juice clarification, the starch must be decomposed.

For this purpose, active fungus-alpha-amylases are added to the apple juice in an acid mileu. However, since these enzymes are only stable at temperatures of at most 30° C., the treatment with amylase must be carried out either subsequent to the pectinase treatment which takes place at higher temperatures, or amylase and pectinase are permitted to act together at temperatures below 30° C. The time of treatment is at least two hours. In this time, the starch is decomposed to dextrins, which do not retrograde further.

It is also already known to decompose the starch with certain other enzymes within 2 to 3 hours at temperatures of 45° – 50° C., in order to avoid disturbances of the pectinase treatment. The clarification process time is extended by such processing, just as in the case of treatment with fungus amylase.

For the preparation of juice concentrates, the pressed juice, freed of coarse turbidifying matter, is dearomatized at 90°–95° C. After cooling to 40° – 50° C., the pectinase treatment can be carried out. Starch-containing juices are cooled further to less than 30° C. for treatment with fungus amylase. For the subsequent settling, a further cooling to 20° C. or less is necessary. After settling and filtration, the juice must again be heated to at least 50° C. in order to concentrate it. Although the considerable demand for cooling water and for heat energy for the reheating presents a considerable cost factor, heretofore no way was known to avoid or limit these costs.

A further disadvantage of the known method is in the long duration of the settling process. For the clarification of starch-free juices, heretofore at least 4½ hours were necessary, namely ½ hour for pectinase treatment at 40° – 50° C. and 4 hours for settling at 20° C. If a subsequent starch decomposition step is necessary, the duration of the clarification method is increased to from 5 to 7 hours.

It has now been found that the clarification can be significantly speeded up if the settling is carried out at higher temperatures than have heretofore been employed. This result is suprising, since, for the settling, a temperature of 20° C. or less —as already described above—has always been viewed as optimum. This is confirmed, for example, by K. Wucherpfennig and P. Possmann in "Fluessiges Obst" page 48, (1972).

According to the invention, the clarification of fruit juices, particularly the juices of pomes, by treatment with pectinases at a temperature between 35° and 55° C., with subsequent settling in the presence of gelatin and silica sol, is detectably speeded up by carrying out the settling at a temperature above 25° and below 55° C.

The complete clarification process is carried out to particular advantage in the temperature region from 45° to 55° C. According to the process of the invention, the duration of settling can be reduced to 2 hours. When treating juice containing starch, it is particularly suitable to treat with a glucamylase at the same time as with pectinase. Surprisingly, in this way the starch is so completely decomposed within a half-hour at the preferred temperature of 45° to 55° C., that the settling can be carried out immediately thereafter. The enzymatic treatment step can also be carried out at lower temperatures, but then lasts somewhat longer. The total time for clarification of fruit juice from pomes, particularly apple juice, is thereby reduced according to the process of the invention to 2½ hours.

The process of the invention offers particular advantages in the treatment of the juices of pomes, which juices have been de-aromatized at at least 80° C., since then between the de-aromatization step and the concentration step there need not be any cooling to the earlier conventional low temperatures for amylase treatment and settling. The clarification method of the invention can be entirely carried out at temperatures between 45° and 55° C. Because of this, not only is a considerable portion of the earlier need for cooling water and heat energy unnecessary, but also additionally the heating times and cooling times are saved. When treating starch-containing juices, the optionally dearomatized juice is adjusted to the desired working temperature between 35° and 55° C. and is then combined with the necessary amount of pectin-cleaving enzymes. Glucamylase can be used in an amount of from 2,000 to 20,000 amyloglucosidase units per hectoliter. (One amyloglucosidase unit corresponds to the enzyme activity which catalyzes the cleavage of 1 micromole of maltose per minute at 30° C. under standard conditions.) After 30 minutes, the pectin is decomposed, as is evident from the alcohol test. According to the iodine test, also no more starch is present. If starch-free juices are treated, the enzymatic clarification step naturally corresponds to the conventional process used heretofore. So that no subsequent opacification caused by starch occurs, the juice should in every case be free of starch before settling, i.e., should give a negative iodine test.

The settling can be carried out directly in the same tank as the enzyme treatment. For this purpose, one hectoliter of juice is combined with 8–20 grams of dissolved gelatin and 50–200 ml of 15% silica sol. The silica sols already used in the art for cold settling are employed: These are colloidal solutions of amorphous silicic acid. As a rule, they are prepared by acidification of diluted water glass solutions and are then desalted.

For the separation of proteins, bentonite can be employed in a known fashion. Although a slight acceleration of the settling process is detectable at 25° C., in comparison with the conventional settling at 20° C., the settling proceeds quite significantly faster above 35° C. The shortest settling time is first reached in the temperature region from 45° – 55° C. The flocculation of turbidifying materials according to the hot clarification method of the present invention is not only comparable with the results of the heretofore conventional cold clarification method, but is in many cases even better, which leads to an increased brilliance of the juice. After the clarification, the juice can be filtered hot and led directly into the first concentration stage.

Whereas heretofore the duration of a clarification process was strongly dependent on the starch content of the juice, one skilled in the art using the process of the present invention can adjust himself to a fixed working time, independent of starch content, whereby planning and organization of the processing can be considerably simplified and improved. As a result of the shorter treatment time, the capacity of the apparatus used for clarification can be approximately doubled without additional investment. Further, the danger of microbiological impurities, for example, yeast growths, is considerably lower at temperatures in the region near 50° than at 30° C. In general, the danger of contamination is reduced by reduction of the standing times.

The invention is primarily used for the treatment of apple juice. Nevertheless, the same advantages are achieved in working up pear juice or quince juice.

A better understanding of the present invention and its many advantages will be had by referring to the following specific examples, given by way of illustration.

EXAMPLE 1

Starch-containing apples are ground and pressed. From the juice obtained, the gross opacifying matter is removed. After separation of the aromatic materials at 95° C., the juice is cooled to 50° C. and combined with 5 g/hl of a commercial pectinase and 5 g/hl of a glucamylase having an activity of 2000 glucamylase units per gram. After a treatment time of 30 minutes at 50° C., the alcohol test for pectin and the iodine test for starch are negative. Now 50 g/hl of bentonite, 100 g/hl of silica sol (15% in water), and 15 g of dissolved gelatin are added as flocculating agents. Within 2 hours at 50° C., the opacifying matter flocculates out and forms a strongly compacted deposit. The remaining clear juice is drawn off, filtered, and thickened at 50° – 60° C. in vacuum to a clear concentrate.

EXAMPLE 2

Cloudy, pasteurized apple juice which had been stored in tanks and with demonstrable amounts of pectin and dissolved starch is warmed in a juice heater to 35° C. from the storage temperature of 10° C. Treatment with pectinase and glucamylase, as well as subsequent settling, are carried out as in Example 1 but at a temperature of 35° C. The clear filtered juice so obtained is pasteurized and bottled.

EXAMPLE 3

Cloudy, pasteurized pear juice, stored in tanks, and which contained little pectin and (according to the iodine test) no starch, is warmed to 50° C. and treated with 5 g/hl of commercial pectinase for 30 minutes. For subsequent settling at 50° C., 50 g/hl of bentonite, 100 g/hl of silica sol (15% in water), and a priorly exactly determined amount of 8 g/hl of gelatin are added. After 2 hours, the opacifying materials have settled as a deposit. The clarified juice is filtered and pasteurized.

What is claimed is:

1. In a method for the clarification of fruit juice by treatment thereof with pectinase at a temperature between 35° and 55° C. and subsequent settling in the presence of gelatin and silica sol, the improvement which comprises carrying out the settling at a temperature between 35° and 55° C.

2. A method as in claim 1 wherein, as a further improvement, a glucamylase is added to the juice with the pectinase.

3. A method as in claim 1 wherein the entire clarification method is carred out at a temperature between 45° and 55° C.

4. A method as in claim 1 wherein, as a further improvement, bentonite is additionally present during settling.

5. A method as in claim 1 wherein, as a further improvement, said juice is de-aromatized prior to treatment with pectinase.

* * * * *